Sept. 9, 1952     C. C. HERITAGE     2,610,138

MANUFACTURE OF RESIN-BOUND FIBER STRUCTURE

Filed Nov. 27, 1945

Inventor
Clark C. Heritage
by W. Bartlett Jones,
Attorney.

Patented Sept. 9, 1952

2,610,138

UNITED STATES PATENT OFFICE 2,610,138

MANUFACTURE OF RESIN-BOUND FIBER STRUCTURE

Clark C. Heritage, Cloquet, Minn., assignor to Wood Conversion Company, St. Paul, Minn., a corporation of Delaware Application November 27, 1945, Serial No. 631,117

2 Claims. (Cl. 154—101)

The present invention relates to the synthesis of mechanically rugged low density fibrous structures exhibiting substantial strengths and elasticities and particularly resistant to the action of liquid water, employing such hydrophilic materials as cellulose, or lignocellulose of any desired degree of lignification or delignification, and aqueous dispersions of thermosetting binders having water-insolubility when thermoset.

It is old in general to form fiber mats by moving fibers through a spray of aqueous adhesive, felting the resulting adhesive-carrying fibers into a mat, and drying the adhesive and fiber with or without compression of the wet mat.

It has been ascertained that when an aqueous solution of certain and various thermosetting resins are employed in an atomized spray as the adhesive for the fibers, a useful blanket may or may not be formed. For example, given a certain solution of phenolformaldehyde condensation product for forming a resin binder, and given a blanket-forming procedure, a cellulosic mat so formed is brittle and crumbles and lacks utility; but a few weeks later the same materials and process may well make an excellent useful strong and flexible blanket. A study of the subject has revealed that the difference in said mats is a structural one. The brittle blanket has cellulosic fibers so impregnated with the resin, that the resin is set inside the fibers, thus tending to embrittle them, and thus to leave very little resin for interfacial contacts between fibers. The useful mat has its resin-bearing fibers coated in whole or in part with a microscopic thin film of set resin, and has interfacial layers of resin at contact points resulting from capillary layers of resin solution provided by the liquid film which is present on the fibers, when fibers wet with the binder solution come into contact in the processing, and particularly when compressing before drying.

These studies have also revealed that the resin solution must be such as preferentially to coat rather than to impregnate the fiber. No criterion except empirical test, has as yet been found to define the resin solution, which, in addition, may be variously defined in accordance with variations in the process or the fibers employed as well as in other factors. However, it is known that increase in viscosity characteristics of the resin solution can effect a non-impregnating property. Such viscosity can be increased, for example, by further advancing the resin, either in manufacture, or by heating or aging after manufacture, by varying the concentration of the adhesive solution, or by incorporating suitable thickening agents in the solution.

It is, therefore, an object of the invention to produce resin-bound cellulosic mat structures, wherein the fibers acquire new properties, as fibers, by reason of thin resin films carried on and by them, and wherein such fibers impart special property values to the mat.

It is also an object to provide a cellulosic fiber mat of which the fibers are so bound together by a water-resistant adhesive, and chemically blocked whereby the mat retains its structural entity in contact with water, and upon drying returns substantially to its initial quality.

It is also an object to provide a mat of which the fibers are at least in part so surface-coated with a thin film of water-resistant resin, that the mat as a whole is resistant to damage by water.

It is an object of the invention to produce a cellulosic fiber mat with a wide range of property values, by choice of fiber, choice of resin, choice of resin usage, choice of resin concentration in adhesive solution, choice of density, and choice of conditions regulating the interfelted and bonded relations of the fibers, both before, during and after setting the resin.

The product of the invention may be made in various ways, and in connection with the preferred way, the accompanying drawings are given in explanation. In the drawings.

Figure 1:
Fig. 1 represents a single fiber and two droplets of liquid suspended in air and about to meet the fiber.

From the foregoing general statements it will be clear that a given resin which penetrates and impregnates the fibers, may be aged and thus "thickened" to a condition where it coats a fiber preferentially to penetrating it. It is to be understood that there are intermediate and borderline conditions with respect to a given processing of fiber and resin to form cured-resin blanket, such that a change of time from applying resin solution to thermosetting the resin, will throw the borderline cases from one side to another. In other words, a resin solution may both coat a fiber and impregnate it, the impregnation being slow and drawing upon resin in the coat. The present invention aims to avoid complete impregnation with resulting brittleness of fiber and loss of coating resin, and to maintain a protective coat and surface-bonding quantity of resin. Thus, the time factor, resin qualities, and usage, are interrelated, and beyond precise definition.

Experience with the effect of water on the mats or blankets obtained by the present invention, leads to the conclusion that the natural capacity of cellulosic fibers to take on and hold water, is lost, or greatly reduced by the presence of the resin. Without other evidence in favor or to the contrary, it is believed that there is a chemical blocking of polar groups in molecules of the fibers. This is in substantial agreement with the disclosure in Stamm and Seborg in No. 2,354,090, wherein it is described that a phenol-formaldehyde resin-forming mixture, has the ability to penetrate the cell walls of wood when it is substantially unpolymerized. It is also described how the free polar groups combine with polar groups of cellulose and lignin to cause loss of the hydrophilic properties arising in those groups.

However, where Stamm and Seborg desire entry of the resin-forming material into the cell wall, applicant desires to minimize or exclude such entry, and does so by using a mix more advanced than that of Stamm and Seborg. But in each case, the binder, being water-soluble, is not sufficiently advanced to be free of reactive polar groups. Thus, in applicant's use where confinement to a coat is the objective, there can still be chemical bonding to the fiber by the same mechanism described by Stamm and Seborg. It is accordingly believed that the resin coat or bond on the cellulosic fibers, is chemically bound to the fibers, thus giving the resin-bond its notable permanence against physical dislodgment, and thus imparting the high resistance to disintegration of the mat by liquid water.

Such a blanket may be made by first providing a supply of individualized cellulosic fibers for distribution as such. In the case of wood and other lignocellulosic vegetable matter providing in nature integrated bundles of such fibers, these bundles are broken up by physical or chemical action, or both. Thus, from vegetable matter, chemical pulp, semi-chemical pulp or mechanical pulp, or the like, may be used. From wood, sulfite pulp, sulfite screenings, ground wood fiber, and many others, are available and have been used.

The blanket may be made by coating the resin-forming aqueous solution on all or part of the fiber, in a very thin film, and then felting the fibers together while they are so wet, and setting the structure before absorption takes place. Where fibers come in contact at wetted surfaces thereof, they unite to a degree in wet form by capillary action. The wetted fibers so touching in a mat form, are then quickly dried by applied heat to react the resin supposedly with the fiber and also to set the resin which is located both on numerous fibers and at numerous contact regions. The wet mat before such drying may be variously manipulated and formed, but preferably it is merely compressed to a uniform thickness for drying. One or more compressions may be effected, multi-stage compression by rolls being preferred to single-stage compression.

The resin-forming solution is preferably aqueous. However, not all resin-forming solutions may be used. Some such solutions penetrate the individual cellulose fibers, and some do not. Some react properly to induce water resistance, some do not. The solution must be such as readily to wet the surface of the fiber, and to coat it superfically with a film of resin-forming material for a suitable time for permitting the desired physical manipulations which precede the heating and setting. The resin-forming solution must be such in character, for example, in molecular magnitude of its dispersed content, as preferentially to coat rather than to impregnate the fiber. Those resin solutions which do penetrate the fiber, may carry resin to the interior, and if the ultimate resin is a brittle one, the finished fiber may be embrittled on setting the resin; and if an insufficient quantity of such impregnating resin is employed so that coating beyond an impregnation cannot be effected, there is a very poor bond and no useful blanket can result. Suitable synthetic resin-forming material which is water-soluble may be used. In the case of phenol-formaldehyde condensation products which are water-soluble, the resin-content can be insufficiently polymerized in the binder solution, so that cellulose fibers are readily impregnated, and such a solution can be aged or its resin-content advanced so that it will preferentially coat rather than impregnate the same fibers with a minimum of impregnation. Advancement should not be carried too far since both physical and chemical bonding are involved. Likewise, such solutions as will impregnate by reason of the little-advanced resin content, may be rendered less impregnating by inclusion in the solution of a thickening agent, preferably one which is stable as such in the solution, as described hereinafter.

The preferred manner of applying the binder solution to the fibers merely to provide film areas on the fibers for bonding with other fibers, is to atomize the solution into a fog-like mass, and to disperse individualized fibers into this fog. The fog particles, having liquid which wets the fibers, thus hit and spread as collars or envelopes around the fiber to the extent permitted by the spreadability of the solution, its amount, and the surface area of the fiber. Some fibers may be entirely coated, and some partially coated, this being all a matter of chance involving also the size of droplets compared to a fiber. Bundles of fibers for such an operation, or clots of individual fibers or bundles, are most undesired, because a small amount of resin does little good, and the interior of the bundles or clots are unwetted; and because in the same circumstances a large amount of resin becomes housed in too many capillary pools, wastefully of resin for its ultimate function. Such two extreme conditions both lead to non-uniformity in a blanket resulting from deposition of such binder-coated clotted fibers.

The preferred method of depositing the binder-coated fibers is by the velocity of falling by gravity onto a like deposited layer. This is preferably done in a manner to provide a uniformly thick mat, by employing a large gravity-depositing chamber into which individualized fibers, preferably dry, but permissibly moist, and a suitable atomized liquid binder, are injected, under conditions to mix and disperse high in the chamber, and then to drop by gravity onto a conveyor moving through the bottom of the chamber.

A mass of such gravity-deposited binder-wet individual fibers is a fragile layer and has no useful tenacity or strength or integration. Each fiber is merely piled on others. It is a shiftable mass, very easily upset or compressed by the slightest force, to effect both interfelting of fibers and more fiber contact junctions. Such a layer as initially formed at a uniform depth, say 5 inches, having a ratio by dry weight of about 7 to 25 parts of resin solids to 100 parts of cellulose fiber, may have a fiber-resin density of about .4 lb. per cubic foot. By control of the process its initially deposited density may be greater or less. As formed, or as slightly compressed after formation, the deposit becomes practically useful when dried and bound, at a density of about .5 lb. per cubic foot. In setting the binder, as by drying, the fragile mass becomes integrated and has practical utility. Its utility increases at greater densities, and for thermal insulation purposes its utility is limited at densities over about 5 lbs. per cubic foot. For thermal insulation purposes the practical range of densities is from about .5 to about 5 lbs. per cubic foot. From the all-around standpoints of commercial production, handling, shipping, and installing, the preferred density range for the products of the present invention is from 1 to 4 lbs. per cubic foot.

In compressing such a gravity-deposited layer wet with unset binder, the fibers become more felted, and more fibers contact other fibers, giving regions of potential bonds upon subsequent drying of the resin-bearing fibers. The wet mat as deposited, therefore acquires more strength by interfelting of the fibers effected by compressing the initial deposit. This is important in any forming apparatus where the wet mat is couched from a forming wire to a carrier wire on which it is dried. The mat as deposited at a density (dry weight) of about .4 to .5 lb. per cubic foot is too weak for such a couching transfer, but at an increased density (dry weight) effected on the forming wire at formation or by compression, there may be developed sufficient strength by interfelting to permit a transfer from one carrier to another. With certain transfer mechanisms, such as the type having adjacent rolls for reversing the directions of forming and carrier conveyers, the mat becomes transferable at about .8 lb. density (dry weight) and is readily transferable at about 1 lb. density.

Upon drying, resin-bonds will occur only where resin-bearing liquid is present at fiber contacts. There may be contacts devoid of resin, but there are and must be comparatively many contacts which are wet with resin. Density, resin usage, and fiber character, such as fiber size and form, all determine the relative number of contacts with resin bonds.

Resin concentration, resin usage, compression prior to drying, time interval between coating and setting, density, and fiber character all play their parts in the extent to which fiber portions in free spans of fibers in the mat are coated or are impregnated with resin-bearing liquid. The more such coating or impregnation, the more the final blanket properties are affected and modified by resin content which is not bond. The dry resin on or in the free spans of fibers changes the property values making them stiffer, more resistant to compression, weaker in tension, less flexible and more water-resistant. Because the resin at the bond is water-insoluble, the blanket resists disintegration when subjected to water. Such a blanket can be plunged into water, handled in the soaked condition, and then dried without loss of its integrity and with little change in its property values. It has a high wet strength when immersed in water.

In the drawings, the numeral 10 is representative of a lignocellulosic fiber, such as a flat ribbon form of sulfite-cooked wood fiber. Numerals 11 and 12 represent droplets of atomized resin-forming solution, such as will be hereinafter described, for example, one which has approximately 7% of resin-solids therein of a phenol-formaldehyde condensation product stabilized in alkaline solution, and so advanced or otherwise processed that the solution does not effectively impregnate the fiber within the permissible time period from coating to thermosetting.

Figure 2:
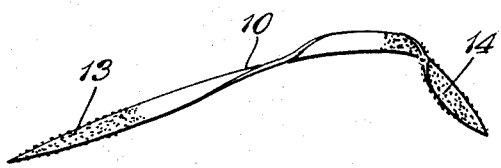
Fig. 2 represents the materials of Fig. 1 after the two droplets have met the fiber and spread their solution content as liquid films over the fiber.

Fig. 2 represents the same fiber 10 after the droplets 11 and 12, suspended in air with the fiber, have hit the fiber 10. The solution readily wets the fiber. Surface tension causes the solution to spread over the fiber as a thin film. In some cases, one, two, or even more droplets may contain enough resin solution completely to coat fiber 10, and this is the preferred condition. But for the purposes of illustration, it is shown that droplets 11 and 12 each coat an end of fiber 10, as shown at regions 13 and 14, leaving a dry uncoated area.

Figure 3:
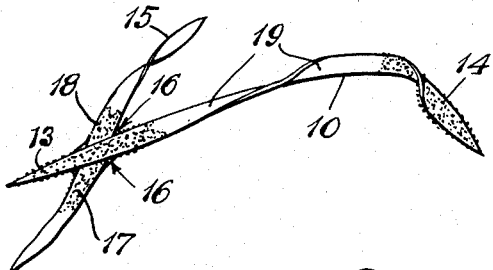
Fig. 3 represents a second fiber as having made contact with a wet film on the fiber of Fig. 2.

In Fig. 3 fiber 15 is represented as a dry fiber which has escaped contact with a droplet of binder solution. It is illustrated as having come into contact with wet region 13 of fiber 10, and as having robbed fiber 10 of some of its liquid coat 13. Thus, liquid from region 13 in Fig. 2 may supply capillary pools 16 at the junction of fibers 10 and 15, and also provide some wetting film coats 17 and 18 on fiber 15, with a possible dry region 19 on fiber 10.

Figure 4:
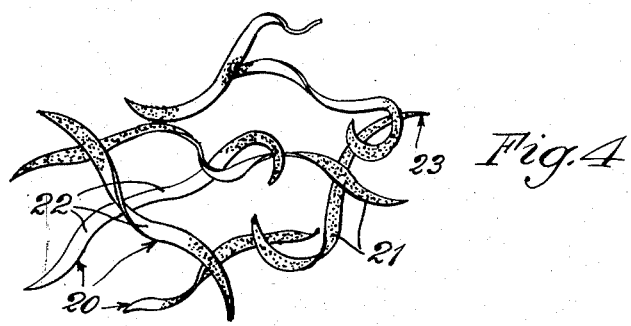
Fig. 4 represents numerous fibers in a finished blanket with resin bonds at fiber junctions, and resin coats elsewhere over portions of fibers.

Fig. 4 represents a fragmentary portion of a very loose mass of such coated fibers 20, showing surface portions 21 coated, and other surface portions 22 uncoated, with fibers such as 23, entirely coated. Upon compression it is obvious that fiber contacts increase in number, with an increase in bond by the binder thus located at fiber contacts.

Figure 5:
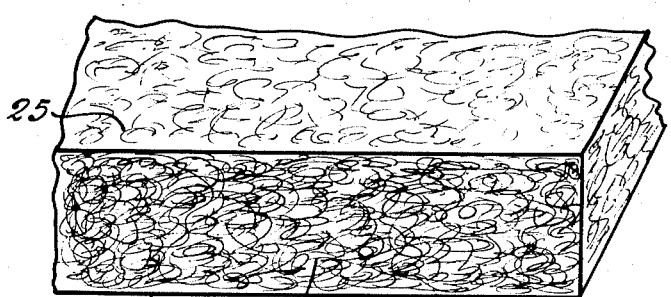
Fig. 5 represents a mat of many fibers in the relationship shown in Fig. 4, but with all the fiber surface coated with resin.

Fig. 5 represents a mass 24 of wet-coated fibers more dense than the mat illustrated in Fig. 4 as a result of compression to a uniform thickness, as by compression rolls, and having when dry a fiber-resin density of 1 to 5 lbs. per cubic foot. The parallel faces are indicated by the numerals 25 and 26.

BINDER A

A suitable resin is made as follows:

By weight 1,000 parts of phenol ($C_6H_5OH$) M. P. 41° C., 1,600 parts of formalin (37% by weight) solution of formaldehyde in water, 60 parts of caustic soda dissolved in 98 parts of water, are reacted for 3 hours at 60° C. Then an additional quantity of 60 parts of caustic soda dissolved in 98 parts of water, is added, along with 800 parts of water. The temperature is raised to 80° C. and the heating continued until the mass has a viscosity (at 25° C.) in the range from 1,200 to 5,000 centipoises. The material is then cooled and is ready for use.

The foregoing corresponds to 1.85 moles of formaldehyde to 1 mole of phenol. The product is an aqueous solution of the condensation product which is well stabilized by the alkali content against early gelling by normal advancement prior to use. It may be stored for several weeks at ordinary room temperature, and as freshly made or after such storage, the solids are still soluble in the alkaline solvent. It contains about 42% by weight of resin solids. When used to coat fibers, as by producing a fog as described, the reaction product is diluted with water to provide a solution having about 7% by weight of resin solids.

BINDER B

By weight 20 parts of polyvinyl alcohol (saponification number of 12 to 90 where the material is the commercial hydrolyzed polyvinyl acetate) is added to 600 parts of formaldehyde as formalin in about 1,600 parts of 37% by weight solution in water.

When the polyvinyl alcohol is well dispersed, 1,000 parts of phenol (M. P. 41° C.) is melted and added to the said formalin. The mass is heated to 40° C. at which temperature 30 parts of caustic soda dissolved in 51 parts of water, is added. The mass is then heated to 80° C. during a heating period of 105 minutes, and the temperature of 80° C. is maintained until a specimen withdrawn and tested at 25° C. exhibits a viscosity of 1,200 to 1,300 centipoises. The holding time is about 4 hours. Then the mass is cooled to 60° C. at a rate of about 70° C. per hour, during which time the viscosity will increase by continued reaction by about 100 centipoises measured at 25° C. At 60° C. or below, another 30 parts of caustic soda dissolved in 51 parts of water is added, thus increasing the viscosity measured at 25° C. by about 150 centipoises. When cooled to 4.5° C. (40° F.) the viscosity increases by about 50 centipoises measured at 25° C. The mass is stable for long periods, in some cases even for about one year, without precipitation, or gelling, or appreciable change in viscosity. The final viscosity will be from 1,500 to 1,600 centipoises at 25° C.

As used in the present invention for producing a fog, it is suitable at a dilution to 7% resin solids.

In the binders A and B, phenol and formaldehyde are used in the ratio of 1 mole to about 1.85 moles. The condensation is effected and polymerization is limited, to give an aqueous soluble product still reactive and polymerizable to insoluble form. Such binders tend to age thus to increase viscosity and finally to gel. To give adequate storage time permitting such advancement of the resin, and yet to give a desirable initial viscosity, the polyvinyl alcohol is employed in binder B. However, this is not essential, and may be omitted, of course where the resin solution is used while it remains as an ungelled solution. Thus, such solutions of binder diluted to about 7% for spraying to fog-particles, readily wet and coat cellulosic fibers without that degree of penetration which fully impregnates the fiber in a time on the order of about 1 to 11 minutes, which is the range of time interval which has been employed in actual practice between coating the fibers and entry of the compressed mat into a drier to dry and thermoset the resin on the fibers.

It is to be understood that shortening of the said time interval will in general permit using a more penetrating resin solution, while increasing the time interval can make one which is suitable for the given range, unsuitable, by reason of the extended time permitting the resin solution, even though it be present initially as a coat, to strike into the fibers, disadvantageously to the product, and the economy.

The drier is preferably steam-heated and such as to subject the wet mat to a drying temperature at or above the boiling point of water, the higher the better, up to a temperature of about 300° F. above which, and particularly at 350° F. desired properties are lessened by thermal degradation. The higher the temperature, the more rapid the rate of setting. In the examples hereinafter given, except as otherwise noted, a large steam-heated oven has been used into and out of which the mat moves, the operating temperature ranging upwardly from at or below 212° F. at the entry end to 230° F. just inwardly of the entry, and to 260° F. at the discharge end.

Although the resin compositions above described provide brittle and not plasticized resin bodies, the mats bound with such resin, in accordance with the present invention, are not brittle, and the bonds are not of such brittle character that they readily rupture. Because the fibers are not saturated, or even heavily impregnated with resin, the fiber exhibits some of its unimpregnated flexibility. Where a "brittle" resin is employed, a well impregnated fiber is embrittled. Thus, by choice of resin, and by timing, the flexibility of the product is controllable. It is preferred to minimize impregnation by use of suitably advanced, yet highly reactive, resin, which in solution as applied and as present while being dried and thermoset, remains as a coat with a minimum of impregnation.

However, using sufficient resin solution to leave a coat, impregnation may be permitted or even complete, where the fiber is not brittle after impregnation. The minimizing of impregnation in such case is for the purpose of preserving on the fiber a fluid liquid film to give a bonding quantity of resin upon drying as described.

In carrying out the process both thin and thick mats may be produced in the same equipment. Thin mats may be run faster, thus giving a shortened time interval. For use over a wide range of conditions a single binder supply is preferred, which operates at slow or fast speeds of the machine and on a wide variety of fibers. It has been found that an aqueous liquid of phenol-formaldehyde condensation product, is thus useful, when meeting the following specifications:

Total solids content__ 39 to 41%
Alkalinity _____ 3.0 to 3.1% NaOH
pH _____ 9.9 to 10.0
Specific gravity ____ 1.14 to 1.15
Viscosity at 25° C.__ 4000 to 7000 centipoises
Refractive index ___ 1.450 to 1.460
Water solubility ___ miscible in all proportions
Cure time at 150° F._ 10 seconds maximum However, the above are not limitations. For example, resins have been employed of which the viscosity has been 1,200 centipoises, or 10,000 centipoises. Alkalinity may be greatly increased, and has been as high as 17.5% based on resin solids.

BLANKET PROPERTIES

The properties of the blanket may be made to vary over a wide range by selection of the fiber, selection of binder, variation of proportions of fiber to binder, and variation of processing conditions including compression of the blanket either before or after drying, or both. Properties are variously expressed as follows:

THICKNESS AND DENSITY

ASTM standards are used to determine thickness, from which and the weight, the density is calculated, and commonly expressed in pounds per cubic foot.

BOND

A specimen of a foot square of blanket is cemented with each broad face to plane surfaces, which are pulled apart until medial rupture of the blanket. The stress at rupture thus becomes the bond, expressed in pounds per square foot.

TENSILE STRENGTH

This is the stress to rupture a test specimen in cross section. Two opposite ends of a foot square specimen are clamped and pulled apart to effect rupture. The stress at rupture is expressed as pounds per square foot of cross-sectional area.

COMPRESSION

This is the force to compress the blanket facewise to one-third its uncompressed thickness. Circles of the blanket having 6 inch diameter are cut and stacked to a pile not over 3¾ inches high (for the apparatus employed). A plate on the pile is moved to compress the pile at a rate of 2 inches per minute. The compression of the pile is arrested when the pile is one-third of the initial pile height, and then at 80 seconds from the initiation of compression the compression force exerted on the pile is read, and converted to pounds per square foot facial area.

RESILIENCE

This is the spring-back after compression. In the compression test, at the said 80-seconds mentioned therein, the pressure on the pile is released, and the pile allowed to expand for 45 seconds, after which it is substantially stable. The expanded volume is then measured. Resilience is expressed as the per cent recovery of the volume lost in compression.

ROLLABILITY

This is the tensile strength of a test specimen which has previously been wrapped about a 6-inch diameter wooden mandrel. It is expressed as pounds per square foot. Occasionally it is expressed as a percentage ratio of tensile strength after rolling to tensile strength before rolling.

THERMAL CONDUCTIVITY

This is a measure of the rate of heat transfer through a test specimen when measured in the standard 12″ x 12″ guarded hot plates (as specified in ASTM tentative Methods of Test C177-42T). It is expressed as B.t.u./hour/sq. ft./1° F./inch of thickness of material under specified terminal temperatures.

ACIDITY OR ALKALINITY

This is the hydrogen ion concentration of a water extract made from the test specimen. A quantity of 10 grams of oven dry mat, or 10.7 grams of air dry mat, is digested in 100 cc. distilled water for ¾ hour at 120° to 140° F. The container is then stoppered and the content cooled to room temperature. The solution is then tested for pH.

COLLAPSE

This is a measure of the shrinkage in thickness of a 1 foot square test specimen soaked in water for 15 minutes, drained for 15 minutes, and dried out in an oven at 212° F. It is expressed in per cent of the original thickness.

RESISTANCE TO COMMON MOLD PRODUCING ORGANISMS

Sterile specimens of test material are placed in glass containers, each of which is then inoculated with one of four common mold-producing organisms. Penicillium Sp., *Aspergillus niger*, *Trichoderma lignorium*, and *Chetomium globosum*. The containers are then tightly sealed at the optimum moisture content to grow the particular mold. The following information is recorded for comparative purposes: (1) The time in days to produce the first visual indication of mold, and (2) amount of mold growth after 30 days expressed as a visual judgment rating 0 to 5, wherein 0=no mold growth and 5=maximum mold growth.

It is noted that the phenol-formaldehyde binder of the present invention gives protection against the above molds such that the test shows no mold growth in 30 days.

WATER RESISTANCE

This is expressed in terms of tensile strength, which is determined after: (1) soaking for 15 minutes in water and draining for 15 minutes, and (2) soaking for 15 minutes in water, draining, and drying for 48 hours. Condition (1) is expressed as "wet tensile strength."

TRANSVERSE STIFFNESS

This is measured by the rate of deflection of a test specimen placed to overhang the edge of a horizontal plane surface with one foot of material projecting with self support. It is expressed as inches deflection per foot of overhang at the end of one minute.

*Table I*

PROPERTY VALUES OF VARIOUS BLANKETS

| Property (and units) | S-293-214 | A | B | C | D | D¹ | E | E¹ |
|---|---|---|---|---|---|---|---|---|
| ASTM Thickness_____inches__ | ¹1.14 | 1.23 | .63 | 1.13 | .80 | 1.07 | .88 | .97 |
| ASTM Density_____lbs./cu. ft__ | ¹1.53 | 1.83 | 1.76 | 1.43 | 2.41 | 1.70 | 2.11 | 2.00 |
| Bond_____lbs./sq. ft__ | 45 | 70 | 36 | 70 | 98 | 89 | 50 | 160 |
| Tensile Strength_____lbs./sq. ft__ | 436 | 595 | 359 | 281 | 1050 | 516 | 516 | 575 |
| Compression_____lbs./sq. ft__ | 438 | 853 | 734 | 477 | 1241 | 714 | 850 | 917 |
| Resilience_____percent recovery__ | 95 | 79 | 67 | 71 | 70 | 72 | 69 | 62 |
| Rollability_____lbs./sq. ft__ | 473 | 580 | 376 | 308 | 1116 | 611 | 511 | 716 |
| Collapse (see)_____percent__ | 4 | 12 | 19 | 33 | | | 23 | 9 |
| Thermal Conductivity (see)_____ | .221 | .233 | | | | | | |
| Acidity or Alkalinity pH_____ | 8.85 | | | | | | | |
| Transverse Stiffness (see)_____ | 1.34 | | | | 1.1 | 1.2 | 1.0 | 0.0 |
| Wet Tensile Strength_____ | 338 | 299 | 161 | 122 | 381 | 249 | 175 | 328 |
| After Soaking and Drying: | | | | | | | | |
|   ASTM Thickness_____ | ¹1.15 | | | | | | | |
|   ASTM Density_____ | ¹1.63 | | | | | | | |
|   Tensile Strength_____ | 575 | | | | | | | |

¹ Different specimens.

Table I presents vertically various properties of different blankets, all bound with phenolic resin. The blankets are labelled horizontally at the top of the table, and are as follows: S-293-214.

This is a blanket made with a mixture of sulfite pulp and sulfite screenings. Binder B solution was used at 8.9% concentration of resin solids in quantity to provide a weight usage of 25.6 parts of resin per 100 parts of fiber. This provides excellent insulation for refrigerator cars.

BLANKET A

This is unbleached sulfite fiber, using binder at 6.5% concentration of resin solids, at a weight usage of 16.2 parts of resin per 100 parts of fiber. The blanket provides excellent railroad car insulation.

BLANKET B

The fiber consists of equal parts of sulfite pulp and sulfite screenings. By weight 18 parts of resin solids (at 7% concentration in water) are used per 100 parts of fiber. It makes excellent packing, as for delicate instruments.

BLANKET C

This is a modified monosulfite aspen fiber, as made by the process of Textor Patents No. 2,022,872 and No. 2,022,873, using binder A at 7% resin solids concentration and 18% usage. These blankets illustrate the effect of processing variation on the properties. Blanket C is the product resulting from drying and curing the moist-rolled mat.

BLANKETS D AND D¹

Blanket D of sulfite jack pine was made from a moist mat wet-pressed to ⅞ inches thickness, and after curing dry-rolled at a roll-height of .75 inch. Blanket D¹ is like Blanket D except that the wet-pressed thickness is 1.25 inches. For both blankets a forming speed of 5.5 feet per minute was employed, making the time period before cure from 3.3 minutes as a minimum to 9.1 minutes as a maximum. Binder A at 18% usage and 7% concentration is used. The effects of fiber character and of processing are readily apparent.

BLANKETS E AND E¹

These show the relative effects of acid and alkali processes in pulping. Fiber for E is 100% aspen sulfite pulp. Fiber for E¹ is 100% aspen soda pulp. The resin and processing conditions are the same as for Blanket D⁵ above. The pronounced differences are in bond and collapse. The change from sulfite pulp to soda pulp improves the values of bond and of collapse.

Table II
BLANKET PROPERTY VALUES WITH VARYING USAGES AND CONCENTRATIONS OF RESIN-BINDER

| Sample S-386 | Wet Mat | | | | Dry Mat | | | | | | | | |
|---|---|---|---|---|---|---|---|---|---|---|---|---|---|
| | Resin Usage | Fiber Percent | Resin Percent | Water Percent | Thickness Inches | Density lbs./cu. ft. | Dry Tensile Strength lbs./sq. ft. | Wet Tensile Strength lbs./sq. ft. | Rollability lbs./sq. ft. | Bond lbs./sq. ft. | Comp. Res. lbs./sq. ft. | Resilience, Percent Recovery | Collapse Percent (see) |
| 167 | 7 | 49.25 | 3.45 | 47.30 | 1.06 | 1.98 | 169 | 113 | 102 | 10 | 405 | 86 | 22 |
| 168 | 10 | 40.25 | 4.05 | 55.50 | 1.14 | 2.00 | 371 | 237 | 265 | 23 | 529 | 90 | 13 |
| 169 | 13 | 34.33 | 4.47 | 61.20 | 1.20 | 2.07 | 460 | 270 | 529 | 37 | 631 | 84 | 18 |
| 170 | 15 | 31.23 | 4.67 | 64.10 | 1.22 | 1.97 | 539 | 315 | 487 | 51 | 574 | 89 | 16 |
| 171 | 17 | 28.54 | 4.86 | 66.60 | 1.17 | 2.00 | 636 | 330 | 537 | 48 | 714 | 90 | 14 |
| 172 | 19 | 26.38 | 5.02 | 68.60 | 1.21 | 2.09 | 641 | 404 | 635 | 65 | 714 | 86 | 14 |
| 173 | 24 | 22.00 | 5.30 | 72.70 | 1.18 | 2.13 | 721 | 363 | 655 | 81 | 657 | 86 | 10 |

PERCENT CONCENTRATION (FIXED RESIN USAGE AT 18%)

| | | | | | | | | | | | | | |
|---|---|---|---|---|---|---|---|---|---|---|---|---|---|
| 174 | 5 | 20.41 | 3.79 | 75.80 | 1.17 | 2.06 | 718 | 398 | 577 | 59 | 731 | 90 | 11 |
| 175 | 6.8 | 25.67 | 4.73 | 69.60 | 1.16 | 1.92 | 582 | 331 | 658 | 51 | 510 | 86 | 11 |
| 176 | 9 | 30.78 | 5.72 | 63.5 | 1.18 | 1.86 | 546 | 322 | 530 | 57 | 501 | 80 | 11 |
| 177 | 11 | 34.95 | 6.45 | 58.6 | 1.22 | 2.00 | 487 | 297 | 534 | 44 | 458 | 85 | 12 |

All the foregoing show how the fiber character plays an important part in controlling or effecting the final properties.

Table II shows the effects of varying usage and concentration of binder B. The table is in two parts. In the top part, binder concentration is constant at 6.8% and usage is varied as shown in the second column. The next three columns give the percent ratio by weight as to fiber, binder solids, and water, in making the mat. In the lower part, the usage is fixed at 18% and the concentration is shown in the second column, which is the only column varying in the two parts of the table.

The fiber used is an unbleached sulfite pulp.

The results indicate for the series: (1) the dry and wet tensile strength rise to a maximum at about 20% usage. (2) Bond rises rapidly, without reaching a maximum at 24% usage, and the high point has not been reached at 24% usage. (3) Collapse falls progressively with increased usage, and the low point has not been reached at 24% usage. (4) Compressive resistance rises to a peak at about 17% usage, then falls off at higher usages. (5) Resilience is not affected greatly by variation in binder usage. (6) Using more water and lower binder concentration, makes the blanket stronger, but water usage is a factor limited by the nature of the process.

*Low density blanket (S-474-75).*—A mixture of dry sulfite fibers, including 25% derived from sulfite screenings, is injected as a stream of individualized fibers into a settling chamber along with a fog-like spray of binder A at 7% concentration, and in amount to provide 15 parts by weight of resin solids per 100 parts of fiber. The mass as formed was heated and dried in an oven at 240° F., without any compression to set the bond. It is specially characterized by lack of a smooth or skin-like surface, having, therefore an irregular surface texture, preferably obliterated in the preferred practice, by wet compression. The blanket has properties set forth in Table III below.

*Felt-like structure (S-474-76)* is produced by processing the initial wet deposit which resulted in the low-density blanket S-474-75. The initial deposit has a density of about .4 to .5 lb. (dry weight) per cu. ft. It is wet-compressed, by rolls, to about 3 lbs. density, at which the product can be readily transferred from a forming wire to a drier wire for entering a drying oven at a drying temperature as described. After drying, the mat was dry compressed to a density of 5.13 lbs. per cu. ft. Its final properties are given below in Table III.

*Table III*

PROPERTIES OF TWO STRUCTURES

| Blanket Properties | S-474-75 | S-474-76 |
|---|---|---|
| Density (lbs./cu. ft.) | 0.52 | 5.13 |
| Thickness (inches) | 2.30 | 0.30 |
| Tensile Strength (lbs./sq. ft.) | 33. | 1,450 |
| Wet Tensile Strength (lbs./sq. ft.) | 33. | 456 |
| Rollability (lbs./sq. ft.) | 33. | 1,415 |
| Bond (lbs./sq. ft.) | 20. | 123 |
| Collapse (percent) | 56 | 0 |
| Resilience (percent) | 56 | 75 |
| Compressive Resistance (lbs./sq. ft.) | 45 | [1] 5,100 |

[1] Value is greater than 5,100 but not indicated by particular test method.

From the foregoing illustrations it will be apparent that a wide variety of blankets may be made by use of the process described. The outstanding property is resistance to water. This is of vital importance to use of such materials for insulation and for protective and cushioning padding. Use as insulation, in many conditions of poor design or uncontemplated circumstances, invites wetting by leakage or by vapor condensation. The ability to stand-up while wet and to dry out without loss of structure and insulating capacity is most important.

The present application is a continuation-in-part of a copending application executed by me, now abandoned and identified as Serial No. 467,040, filed November 26, 1942.

The invention in its numerous aspects is set forth in the accompanying claims.

I claim:

1. The method which comprises dispersing into a gaseous medium 100 parts by weight of dry substantially individualized cellulosic fibers derived from wood, and atomized fog-like particles of an aqueous alkali-stabilized solution containing on the order of about 7% by weight of dissolved phenol-formaldehyde resin-forming solids, in amount to supply from 7 to 25 parts of said resin solids by weight, said solution having the capacity readily to wet any of said fibers and spread over the surfaces of said fibers, thereby to provide a film of said resin solution on a so-wetted fiber, causing said fibers and fog-like particles to mingle in said gaseous medium and to provide liquid film coatings on at least a major portion of said fibers and on at least a portion of the surface of a so-coated fiber, bringing the resulting mixture of fibers and carried liquid into felted-fiber-mat-forming contact whereby fiber-to-fiber contacts are formed in the presence of liquid carried initially by at least one of any two contacting fibers, and drying the resulting mat at a thermosetting temperature for said resin before saturating impregnation of the fibers can occur, whereby to provide resin-bonds from fiber-to-fiber and resin coats on at least some of the surfaces of the fibers.

2. The method which comprises dispersing into a gaseous medium 100 parts by weight of substantially dry vegetable cellulosic fibers, and atomized fog-like particles of a dilute aqueous alkali-stabilized solution in water containing dissolved phenol-formaldehyde resin-forming solids, in amount to supply from 7 to 25 parts of said resin solids by weight, said solution having the capacity readily to wet any of said fibers and spread over the surfaces of said fibers, thereby to provide a film of said resin solution on a so-wetted fiber, causing said fibers and fog-like particles to mingle in said gaseous medium and to provide liquid film coatings on at least a major portion of said fibers and on at least a portion of the surface of a so-coated fiber, assembling the resulting mixture of fibers and carried liquid into a felted mat having a density in the range from about 0.5 to about 5 lbs. of fiber and resin per cu. ft. and suitable for direct thermosetting drying to form a structure of density in said range, and drying the resulting mat at a thermosetting temperature for said resin before saturating impregnation of the fibers can occur, whereby to provide resin-bonds from fiber-to-fiber and resin coats on at least some of the surfaces of flexible fibers.

CLARK C. HERITAGE.

REFERENCES CITED

The following references are of record in the file of this patent:

UNITED STATES PATENTS

| Number | Name | Date |
|---|---|---|
| 1,365,878 | Weiss | Jan. 18, 1921 |
| 1,966,458 | Novak | July 17, 1934 |
| 1,974,519 | Steffens | Sept. 25, 1934 |
| 2,070,330 | Chase | Feb. 9, 1937 |
| 2,136,827 | Schur | Nov. 15, 1938 |
| 2,288,072 | Collins | June 30, 1942 |
| 2,325,055 | Heritage | July 27, 1943 |
| 2,339,562 | Eustis | Jan. 18, 1944 |
| 2,363,480 | Brownlee | Nov. 18, 1944 |